Figure 1:
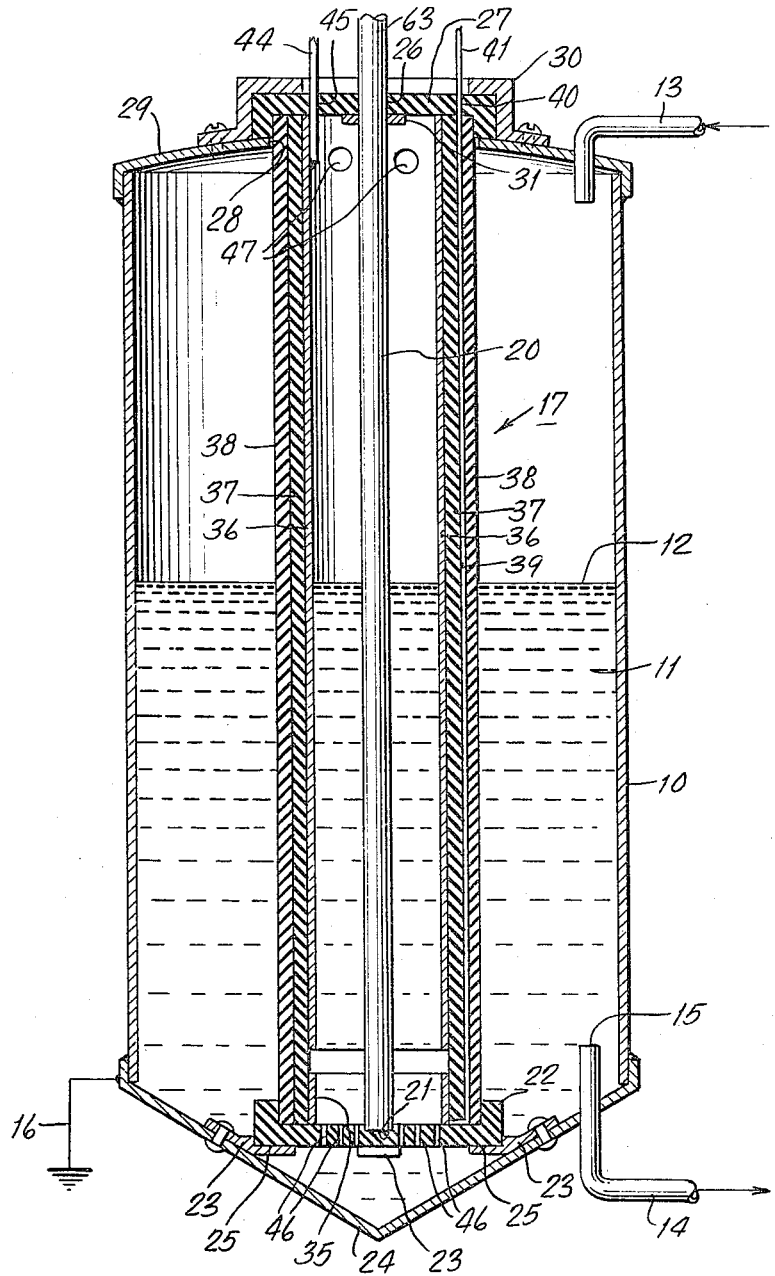

INVENTOR.
RICHARD L. MORRIS

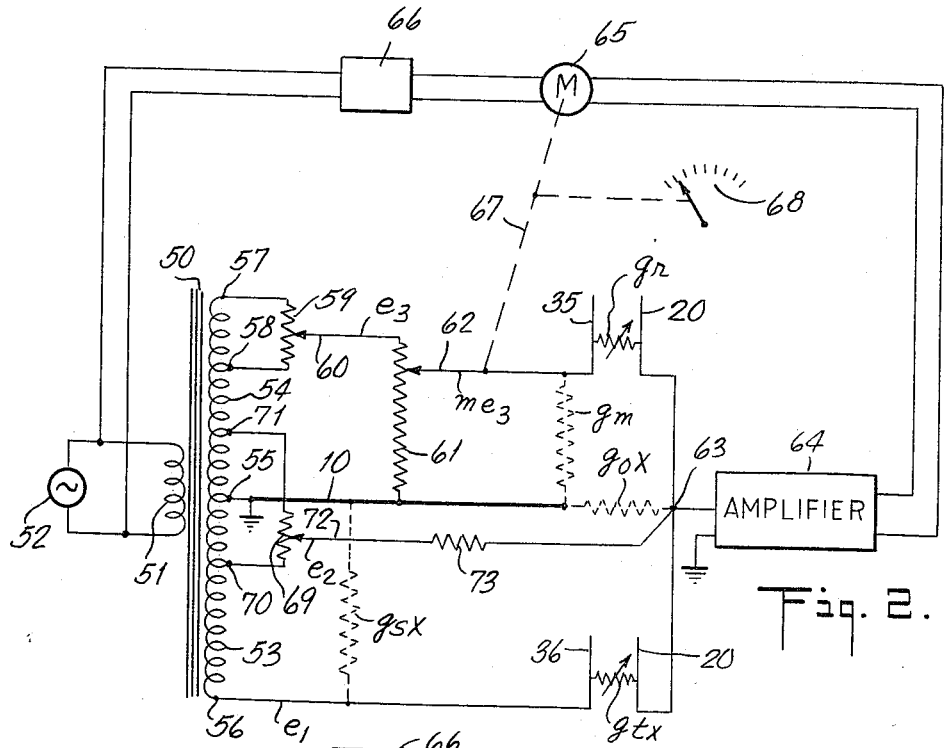

United States Patent Office 3,285,068
Patented Nov. 15, 1966

3,285,068
ELECTRICAL FLUID LEVEL GAUGE
Richard L. Morris, Bellerose, N.Y., assignor to The Liquidometer Corporation, Long Island City, N.Y., a corporation of Delaware
Filed Apr. 17, 1964, Ser. No. 360,680
9 Claims. (Cl. 73—304)

The present invention relates to fluid level gauges and, more particularly, to electrical gauges for indicating prevailing levels of fluids exhibiting significantly high values of electrical conductivity.

One of the oldest and most widely used forms of fluid level gauge is that employing a buoyant float which, in rising and falling with the fluid level, mechanically actuates either a level-calibrated visual indicator or an electrical rheostat or potentiometer included as a control element in an electrical system enabling the visual indications to be accomplished electrically. The mechanical motion-actuating structure used between the buoyant float and the indicator device or electrical control element is undesirable in many applications where moving mechanical components are objectionable for one reason or another and may be prohibited in others due to space restrictions.

An electrical form of widely used fluid level gauge, which dispenses with the buoyant float and associated motion-actuated mechanical structure of the earlier float gauge, is the so-called capacitance type of gauge wherein spaced vertical conductive electrodes constituting a measuring condenser are fixedly supported to be immersed by a non-conductive dielectric fluid to a height varying with the fluid level. The fluid displaces air or gas normally present between the condenser electrodes, and the dielectric constant of the fluid increases the capacitance of the measuring condenser according to the fluid height or level. This change of capacitance is measured electrically as a measure of fluid level and actuates a visual level-calibrated indicator. The dielectric constant of the fluid measured may change with temperature or with different fluids of the same type, or as a result of contamination or additives or as between fluids of different types with which the gauge is intended to be used. A pair of small spaced condenser electrodes supported to be always fully submerged in the gauged fluid enables continuing measurement of its prevailing dielectric constant, and this measurement may be used so to compensate the level indications provided as to render them relatively independent of changes of dielectric constant. The operation of the capacitance type of liquid level gauge is highly dependent upon the dielectric constant of the liquid gauged. Experience has shown that it accordingly cannot, without serious impairment of its accuracy, be used to gauge liquids exhibiting any significant electrical conductivity.

It is an object of the present invention to provide an improved electrical fluid level gauge suitable for accurate level measurements of electrically conductive homogeneous fluids and one which dispenses with any buoyant float or associated motion transmitting mechanical structure.

It is a further object of the invention to provide a novel electrical fluid level gauge for gauging electrically conductive essentially homogeneous fluids and one wherein the gauge indications are relatively independent of changes of electrical conductivity of the same or different fluids with respect to the electrical conductivity of a calibration fluid and hence may be calibrated in volumetric units.

Other objects and advantages of the invention will appear as the detailed description thereof proceeds in the light of the drawings forming a part of this application and in which:

FIG. 1 schematically illustrates in elevational cross-section the construction of a fluid level measuring and conductance-compensating unit and its positioning within a metallic fluid container;

FIG. 2 is an electrical circuit diagram of an electrical fluid level gauge utilizing the measuring and conductance-compensating unit of FIG. 1 and embodying the present invention in a particular form; and FIG. 3 is an electrical circuit diagram of an electrical gauge embodying the invention in modified form.

Referring now more particularly to FIG. 1, a fluid container or tank 10, usually metallic, confines a body of electrically conductive fluid 11 the level 12 of which is to be indicated. The container 10 may be filled with the fluid through an inlet pipe 13 which may be located anywhere but by way of example is shown located at the top of the container, and fluid may be withdrawn from the container through a discharge pipe 14. The latter preferably has its inner end 15 terminated at such a level that all of the fluid may be drained from the container except for a small quantity which remains in the bottom of the container for a purpose presently to be explained, or such small quantity of the fluid may be retained by other appropriate structure or the measuring system may be so designed that accurate measurement is not required as this small quantity is depleted. The container 10 in many applications is electrically connected to ground potential as indicated by the conductor 16, and includes a centrally positioned and vertically oriented fluid level measuring unit 17.

The measuring unit 17 includes a centrally positioned conductive electrode 20 which conveniently may be of circular cross-section and formed of hollow metallic tubing or by a thin continuous metallic film coated on the exterior surface of a hollow tubing of electrical insulating material. The bottom end of the electrode 20 is received in a central bore 21 of a cup-shaped disc 22 of electrical insulating material supported centrally of the container 10 by circumferentially spaced metal brackets 23. The latter are secured by rivets or like fasteners to the bottom 24 of the container as shown, and have end grooves 25 forming an annular seat for receiving and positioning the disc 22. The upper end of the electrode 20 extends through a central aperture 26 provided in a second inverted cup-shaped disc 27 of electrical insulating material. The disc 27 closes a central aperture 28 provided in the top cover 29 of the container 11, and is detachably retained in position by a centrally apertured cup-shaped and flanged retainer cap 30 secured by machine screws on the exterior surface of the cover 29. A collar 31 fixedly secured to the electrode 20 maintains the latter positioned in assembled relation between the insulator discs 22 and 27.

The measuring unit 17 further includes two electrically isolated and axially spaced electrodes 35 and 36 which for convenience are cylindrical and positioned in concentric spaced relation to the electrode 20. These additional electrodes are conveniently formed as individual, thin, continuous, metallic films (shown in FIG. 1 with exaggerated thickness for clarity of illustration) coated on the interior surface of a cylindrical tube 37 of electrical insulating material. The tube 37 and a closely fitting jacket tube 38 of insulating material are supported between the insulator discs 22 and 27 and are maintained by the cup-shaped side walls of the latter in concentric relation to the electrode 20.

The electrode 35 is positioned at the lower end of the measuring unit 17 and is of relatively short length so as to remain at all times fully submerged in the fluid within the container 11 even though the container has been drained except for a residual quantity remaining in the bottom of the container below the end 15 of the discharge pipe 14. It is the purpose of the electrode 35 to provide in conjunction with the lower end of the electrode 20 a conductance compensation reference electrode structure enabling a continuing reference measurment to be made of, and continuing compensation to be provided for, the prevailing electrical conductivity of the fluid within the container 10. An electrical connection to the electrode 35 is made through a conductive lead 39, conveniently formed of a thin sheet metal strip or longitudinally extending metal film strip, which extends upwardly between the tubes 37 and 38 in insulated relation to the fluid in the container and terminates in an electrical terminal extending through an aperture 40 in the disc 27 to a terminal end portion 47.

The electrode 36 is axially spaced a short disantce from the electrode 35 and extends over the major length of the electrode 20, which is thus common to both of the electrodes 35 and 36. Electrical connection is made to the electrode 36 by a terminal 44 which extends through an aperture 45 in the disc 27. The lower disc 22 is provided with a plurality of small apertures 46 which permit entry of fluid between the electrodes 20 and 36 to a height varying with the prevailing level 12 of the fluid, radial apertures 47 extending through the upper end of the measuring unit 17 relieving change of air or vapor pressure interiorly of the latter with rise and fall of the fluid level between the electrodes 20 and 36 so that the same fluid level is maintained within and without the measuring unit 17.

The value of conductivity prevailing at any time between the electrodes 20 and 36 varies with their radial spacing (which, for a cylindrical cross-section container 10, is uniform along their lengths), the specific electrical conductance of the fluid (which for a homogeneous fluid is uniform throughout the body of fluid), and the electrode area which is wetted by the fluid. The same factors establish the value of conductivity prevailing between the compensation electrodes 20 and 35. Thus for any fluid within the container 10 of a given specific electrical conductance, the conductance prevailing between the electrodes 20 and 35 provides a measure of the prevailing electrical conductivity of the fluid. Similarly, the conductance prevailing between the electrodes 20 and 36 provides a measure of the prevailing level 12 of the fluid as between the full level of the filled container and the empty level at which the residual quantity remaining in the bottom of the container below the end 15 of the discharge pipe 14 wets the electrode 35 and preferably wets a preselected short lower length of the upper electrode 36.

While the container 10 has been shown by way of example as having a cylindrical cross-sectional configuration, conventional characterization of the shape or spacing (or both) of either or both of the electrodes 20 and 36 may be used to maintain a desired relation (such as a linear relation) between the prevailing fluid height and prevailing conductance appearing between the electrodes 20 and 36.

The electrical gauge of the invention employs the measuring and conductance-compensating unit 17 just described in an automatically self-balanceable alternating-current conductance electrical bridge having the electrical circuit arrangement shown in FIG. 2. The bridge includes a transformer 50 having a primary winding 51 energized from a suitable source 52 of alternating current and having a tapped secondary winding providing two winding portions 53 and 54. The tap 55 of the secondary winding is electrically connected to the conductor 10 of FIG. 2 which represents the grounded metallic fluid container 10 of FIG. 1.

The end terminal 56 of the secondary winding portion 53 is electrically connected to the electrode 36 of the measuring unit 17 previously described. The end terminal 57, together with an intermediate tap terminal 58, of the transformer winding portion 54 are connected to the end terminals of the resistive element of a full calibration potentiometer 59 having a movable contact 60 manually adjustable along the length of and in electrical engagement with the resistive element of this potentiometer. The resistive element of a potentiometer 61 is connected between the adjustable slider 60 of the potentiometer 59 and the tap 55 of the transformer secondary winding. The potentiometer 61 likewise includes an adjustable slider 62, movable along the length of and in electrical engagement with the resistive element of this potentiometer, which is electrically connected to the conductive compensation electrode 35 of the measuring unit 17 previously described.

The electrode 20 shown in FIG. 2, and corresponding to the similarly identified electrode of the measuring unit, is common to the electrodes 35 and 36 as previously explained and provides an output terminal 63 which is connected to the input circuit of an amplifier included in a unit 64. The output circuit of the unit 64 energizes one winding of a two-phase alternating current motor 65 having its other winding energized from the alternating current source 52 through a phase shifting network 66. The network 66 is conventional, and includes such series and shunt capacitive and resistive electrical components as may be required to establish a quadrature phase relation between the energizing currents flowing in the windings of the motor 65 when measuring the conductance component of bridge output voltage supplied to the input circuit of the unit 64. As is well known, the values of the electrical components employed in the phase shifting network 66 depend in practice on the resistance and inductive reactance of the windings of the motor 65. In many instances, the required quadrature relation between the motor energizing currents may be provided by a network 66 comprised simply by a condenser of appropriate capacitance serially included in one of the energizing conductors extending between the source 52 and the motor 65.

The motor 65 is mechanically connected, as indicated by the broken line 67, to adjust the position of the slider 62 along the length of the resistive element of the potentiometer 61 and is also mechanically connected to operate the pointer of an indicator 68 having a scale calibrated in terms of the volume of fluid in the container 10.

The gauge includes an empty balance potentiometer 69 having a resistive element connected between a tap terminal 70 on the transformer winding portion 53 and a tap terminal 71 on the transformer winding portion 54, the taps 70 and 71 usually providing with respect the intermediate tap terminal 55 alternating voltages of equal amplitudes. The potentiometer 69 includes a slider 72 movable along the length of and in electrical engagement with the resistive element of the potentiometer 69, and the slider 72 is connected through a resistor 73 to the terminal 63 provided by the measuring unit electrode 20 as earlier mentioned.

Considering now the operation of the electrical gauge just described, conductive fluids in the fluid container 10 fills the space between the measuring unit conductance-compensating electrodes 20 and 35. It provides a value of electrical conductance $g_r$ between these electrodes varying, as above noted, with the prevailing electrical conductivity of the fluid. The fluid likewise fills the space between the measuring unit electrodes 20 and 36 to a height depending upon the level 12 of the fluid in the container, and provides a value of conductance $g_t x$ between the measuring electrodes 20 and 36 varying both with the prevailing electrical conductivity $g_t$ of the fluid and its fractional height $x$ within the container.

The conductive fluid also provides a conductive stray path between the measuring unit electrode 36 and the grounded metallic housing of the container 10. The value of this stray conductance $g_s x$ varies with the fluid height $x$, the prevailing specific electrical conductivity of the fluid, and the sum of the cross-sectional areas of all of the apertures 46 provided in the cup-shaped disc 22 of the measuring unit. It will be evident that the value of the stray conductance $g_s x$ may be minimized in a particular application by minimizing the cross-sectional areas of the apertures 46 last mentioned, but in any event the conductance $g_s x$ merely loads the transformer secondary winding portion 53 which may be readily designed to supply this additional loading without significantly affecting normal operational conditions of the self-balanceable bridge. The conductive fluid in the container also causes a conductance of value $g_o x$ to appear between the measuring unit electrode 20 and the grounded metallic housing of the container 10. The value of this stray conductance varies with the prevailing specific electrical conductivity of the fluid, the sum of the cross-sectional areas of the apertures 46 of the cup-shaped disc 22, and the prevailing fluid height $x$ in the container 10. The value of this stray conductance $g_o x$ may likewise be minimized by minimizing the cross-sectional area of the apertures 46 last mentioned, and in any event its effect appears across the input circuit of the unit 64 and may be readily counteracted by providing adequate gain in the amplifier included in the unit 64. Lastly, the fluid in the container 10 causes a stray conductance of value $g_m$ to appear between the measuring unit electrode 35 and the grounded metallic housing of the container 10. The value of this stray conductance $g_m$ varies with the prevailing specific electrical conductivity of the fluid and the sum of the cross-sectional areas of the apertures 46 provided in the cup-shaped disc 22, and may likewise be minimized by minimizing the cross-sectional area of the apertures 46. It will be evident that the stray conductance $g_m$ appears as a load across that portion of the potentiometer 61 between its slider 62 and its lower grounded end, and its effect is merely to modify slightly the desired ideal linearity in the relationship between the adjusted positions of the slider 62 and corresponding levels 12 of fluid in the container 10 according to the bridge operation presently to be described. Such departure from ideal linearity is in practice of no significant consequence and can be corrected by either calibrating the gauge for this non-linearity or tapering the resistance element 61 to provide for this stray load if the calibrated scale 68 is to remain linear from empty to full.

An empty adjustment of the gauge is made by manual adjustment of the slider 72 along the resistive element of the potentiometer 69 until balance of the bridge is established for the condition that conductive fluid is drained from the container 10 to the level of the end 15 (FIG. 1) of the discharge pipe 14. At balance of the bridge, no significant bridge output voltage appears between the bridge output terminals 55 and 63 and no voltage is accordingly supplied to the input circuit of the amplifier 64. This empty adjustment will cause the amplifier 64 and motor 65 to effect an automatic setting of the slider 62 to a position on the resistive element of the potentiometer 61 corresponding to the position of the pointer of the indicator 68 at the empty calibration point on the associated indicator scale. After completion of this empty adjustment, it can be shown that the bridge balance is expressed by the equation:

$$e_2 g_{73} = e g_{st} \qquad (1)$$

where $g_{73}$ is the value of conductance of the resistor 73, $g_{st}$ is the sum of all stray conductances (other than the conductance $g_o x$) appearing between the adjusted position of the slider 62 and the transformer terminal 56, $e$ is the value of voltage which produces current flow through the conductance $g_s t$, and $e_2$ is the value of voltage (selected by adjustment of the slider 72 to either side of the bridge output terminal 55 to have opposite phase to the voltage $e$) between the slider 72 and the bridge output terminal 55.

Following the empty adjustment the container 10 is filled with the conductive fluid and the position of the full adjustment slider 60 is manually adjusted along the resistive element of the potentiometer 59 until, under automatic rebalance operation of the bridge by the amplifier 64 and motor 65, the pointer of the indicator 68 is positioned at the full calibration point of the indicator scale. This adjustment may necessitate a slight readjustment of the empty potentiometer slider 72 followed by a further slight readjustment of the full potentiometer slider 60, but these further adjustments of the empty and full sliders performed one after another are convergent.

Having completed the empty and full adjustments of the bridge, the condition of automatic bridge balance for any fractional height $x$ of fluid in the container 10 is expressed by the equation:

$$e_1 g_t x = m e_3 g_r \qquad (2)$$

where the voltages $e_1$ and $e_3$ are those indicated in FIG. 2, and $m$ is that fraction of the voltage $e_3$ which is selected by the adjusted position of the slider 62 along the length of the resistive element of the potentiometer 61. Equation 2 may be rearranged to the form:

$$m = \frac{e_1 g_t}{e_3 g_r} x \qquad (3)$$

Since the quantities $e_1$, $e_3$, $g_t$ and $g_r$ all have fixed values, it will be evident from Equation 3 that the value of $m$ is proportional to the fluid height $x$ and is independent of the prevailing specific conductance of the fluid.

FIG. 3 shows the electrical circuit of a gauge embodying the invention in a modified form suitable for measuring conductive fluids of lower specific conductivities where capacitive effects play a more prominent part in the gauge operation. This modified form of gauge is similar to that of FIG. 2, similar components being identified by similar reference numerals, except that additional components are utilized to compensate for certain inherent circuit capacitances indicated as broken-line condensers. These are the inherent capacitance $C_r$ between the reference electrodes 20 and 35, the inherent capacitance $C_t$ between the measuring electrodes 20 and 36, the inherent capacitance $C_m$ between the reference electrode 35 and the metallic container 10, the inherent capacitance $C_o x$ between the electrode 20 and the container 10, and the inherent capacitance $C_s x$ between the electrode 36 and the container 10. To minimize the three last-mentioned inherent capacitances, the electrode supporting insulating tube 37 and jacket tube 38 preferably should be formed of a material having a low dielectric constant and the jacket tube 38 in particular should be as thick as practical. The effect of these three inherent capacitances does not materially affect the bridge operation for the reasons pointed out in reference FIG. 2 concerning their associated conductances $g_m$, $g_o$ and $g_s$.

The effect of the measuring electrode inherent capacitance $C_t$ is compensated by a condenser $C_B$ connected between the bridge output terminal 63 and any convenient point 75 on the transformer secondary winding portion 54 having a voltage $e_B$ selected in relation to the value of the condenser $C_B$ to satisfy the relation:

$$e_B C_B = e_1 C_t \qquad (4)$$

The effect of the inherent capacitance $C_r$ of the reference electrodes 20 and 35 is compensated by a condenser $C_K$ connected between the bridge output terminals 55 and 63 through the secondary winding 76 of a transformer 77 having a primary winding 78 energized by the voltage $m e_3$. As indicated by the polarity marking applied to the transformer windings, the voltage of the ungrounded terminal of the secondary winding 76 has opposite phase to the voltage of the ungrounded terminal of the primary winding 78. For any convenient value of turns ratio $n$ of the transformer primary to secondary windings, the condenser $C_K$ has a value selected to satisfy the relation:

$$nC_K = C_r \qquad (5)$$

The operation of this modified form of gauge is similar to that described in connection with FIG. 2 and will not be repeated. Accurate measurements of the height of conductive fluids, independent of the prevailing specific conductance of the fluid, may be made for fluids having dissipation factors (the ratio of resistive to capacitive current flowing through the fluid) at least as low as unity.

It will be apparent from the foregoing description of the invention that a fluid level gauge embodying the invention dispenses with the need for any form of buoyant float and associated motion transmitting mechanical structure, yet is one which readily permits the electrical gauging with high accuracy of the level of electrically conductive fluids independently of the prevailing electrical conductivity and dissipation factor of the fluid.

While two specific forms of the invention have been described for purposes of illustration, it is contemplated that possible changes may be made without departing from the spirit of the invention.

What is claimed is:

1. An electrical fluid level gauge for conductive fluids comprising means providing two alternating voltages having opposed phases and control means for controlling the amplitude of one thereof, a measuring unit included with one of said voltages in an arm of an alternating current bridge and having spaced electrically conductive electrodes adapted to be supported in a fluid container to provide a value of inter-electrode electrical conductance varying both with the level of fluid in said container and the value of conductivity of said fluid, a reference-compensating unit included with the other of said voltages in a second arm of said bridge and having at least one electrically conductive electrode spaced from said measuring unit electrodes and adapted to be supported in said container to be continuously fully immersed in said fluid and provide a value of electrode electrical conductance varying with the conductivity of said fluid and independent of the level thereof, a source of adjustable-amplitude alternating voltage of selectable phase and an electrically resistive unit included in a third arm of said bridge to effect balance thereof at a preselected level of fluid in said container corresponding to the empty level thereof, means responsive to unbalance of said bridge with change of the fluid-level in said container for controlling said control means to maintain a substantially balanced state of said bridge, and means controlled by said last named means for providing an indication of the prevailing fluid-level in said container substantially independently of the prevailing value of fluid electrical conductivity.

2. An electrical fluid level gauge for conductive fluids comprising means providing two alternating voltages having opposed phases and control means for controlling the amplitude of one thereof, a measuring unit included with one of said voltages in an arm of an alternating current bridge and having spaced electrically conductive electrodes adapted to be supported in a fluid container to provide a value of interelectrode electrical conductance varying both with the level of fluid in said container and the value of conductivity of said fluid, a reference-compensating unit included with the other of said voltages in a second arm of said bridge and having spaced electrically conductive electrodes spaced from said measuring unit electrodes and adapted to be supported in said container to be continuously fully immersed in said fluid and provide a value of electrode electrical conductance varying with the conductivity of said fluid and independent of the level thereof, a source of adjustable-amplitude alternating voltage of selectable phase and included with an electrical resistor in a third arm of said bridge to effect balance thereof at a preselected level of fluid in said container corresponding to the empty level thereof, means responsive to unbalance of said bridge with change of the fluid-level in said container for controlling said control means to maintain a substantially balanced state of said bridge, and means controlled by said last-named means for providing an indication of the prevailing fluid-level in said container substantially independently of the prevailing value of fluid electrical conductivity.

3. An electrical fluid level gauge for conductive fluids comprising means providing two alternating voltages having opposed phases and control means for controlling the amplitude of one thereof, a measuring unit included with one of said voltages in an arm of an alternating current bridge and having spaced electrically conductive electrodes adapted to be supported in a fluid container to provide a value of interelectrode electrical conductance varying both with the level of fluid in said container and the value of conductivity of said fluid, a reference-compensating unit included with the other of said voltages in a second arm of said bridge and having a relatively short electrically conductive electrode spaced in opposing relation to an extended lower end portion of one of said measuring unit electrodes and supported in said container to be continuously fully immersed in said fluid and provide a value of electrode electrical conductance varying with the conductivity of said fluid and independent of the level thereof, a resistive potentiometer having an adjustable slider providing a source of adjustable-amplitude alternating voltage of selectable phase, an electrically resistive unit connected to said slider and included in a third arm of said bridge to effect balance thereof at a preselected level of fluid in said container corresponding to the empty level thereof, means responsive to unbalance of said bridge with change of the fluid-level in said container for controlling said control means to maintain a substantially balanced state of said bridge, and means controlled by said last-named means for providing an indication of the prevailing fluid-level in said container substantially independently of the prevailing value of fluid electrical conductivity.

4. An electrical fluid level gauge for conductive fluids comprising means including a transformer winding for providing two alternating voltages having with respect a centrally located ground tap on said winding opposed phases and control means for controlling the amplitude of one thereof, a measuring unit included with the one of said voltages of fixed amplitude in an arm of an alternating current bridge and having spaced electrically conductive elongated electrodes adapted to be supported in a fluid container to provide a value of interelectrode electrical conductance varying both with the level of fluid in said container between preselected full and empty levels thereof and the value of conductivity of said fluid, a reference-compensating unit included with the other of said voltages in a second arm of said bridge and having a relatively short electrically conductive electrode spaced in opposing relation to an extended lower end portion of one of said measuring unit electrodes and supported in said container below said preselected empty level for continuous immersion in said fluid and to provide a value of electrode electrical conductance varying with the conductivity of said fluid and independent of the level thereof in excess of said empty level, a potentiometer having a resistive element connected between terminals on said transformer winding located on opposite sides of said ground tap thereof and having an adjustable slider movable along said resistive element to provide a source of adjustable-amplitude alternating voltage of selectable phase, an electrically resistive unit connected to said slider and included in a third arm of said bridge to effect balance thereof at a preselected level of fluid in said container corresponding to the empty level thereof, means responsive to unbalance of said bridge with change of the fluid-level in said container for controlling said control means to maintain a substantially balanced state of said bridge, and means controlled by said last-named means for providing an indication of the prevailing fluid-level in said container substantially independently of the prevailing value of fluid electrical conductivity.

5. An electrical fluid level gauge for conductive fluids comprising means providing two alternating voltages having opposed phases and control means for controlling the amplitude of one thereof, a measuring unit included with one of said voltages in an arm of an alternating current bridge and having spaced electrically conductive electrodes adapted to be supported in a fluid container to provide a value of interelectrode electrical conductance varying both with the level of fluid in said container and the value of conductivity of said fluid, a reference-compensating unit included with the other of said voltages in a second arm of said bridge and having at least one electrically conductive electrode spaced from said measuring unit electrodes and adapted to be supported in said container to be continuously fully immersed in said fluid and provide a value of electrode electrical conductance varying with the conductivity of said fluid and independent of the level thereof, a source of adjustable-amplitude alternating voltage of selectable phase and an electrically resistive unit included in a third arm of said bridge to effect balance thereof at a preselected level of fluid in said container corresponding to the empty level thereof, means providing a fourth capacitive arm of said bridge for neutralizing the capacitance of said measuring unit electrodes when devoid of fluid, means coupled to said other voltage for providing a fifth capacitive arm of said bridge to neutralize the capacitance of said reference-compensating unit electrodes when devoid of fluid, means responsive to unbalance of said bridge with change of the fluid-level in said container for controlling said control means to maintain a substantially balanced state of said bridge, and means controlled by said last-named means for providing an indication of the prevailing fluid-level in said container substantially independently of the prevailing value of fluid electrical conductivity.

6. An electrical fluid level gauge for conductive fluids comprising means providing two alternating voltages having opposed phases with respect a common grounded terminal and control means for controlling the amplitude of one thereof, a fluid metallic container electrically connected to said grounded terminal, a measuring unit included with one of said voltages in an arm of an alternating current bridge and having spaced electrically conductive electrodes adapted to be supported in said fluid container to provide a value of interelectrode electrical conductance varying both with the level of fluid in said container and the value of conductivity of said fluid, a reference-compensating unit included with the other of said voltages in a second arm of said bridge and having at least one electrically conductive electrode spaced from said measuring unit electrodes and adapted to be supported in said container to be continuously fully immersed in said fluid and provide a value of electrode electrical conductance varying with the conductivity of said fluid and independent of the level thereof, a source of adjustable-amplitude alternating voltage of selectable phase and an electrically resistive unit included in a third arm of said bridge to effect balance thereof at a preselected level of fluid in said container corresponding to the empty level thereof, a fluid-permeable sheath structure of insulating material enclosing said electrodes to reduce the value of electrical conductance between each of said electrodes and said container, means responsive to unbalance of said bridge with change of the fluid-level in said container for controlling said control means to maintain a substantially balanced state of said bridge, and means controlled by said last-named means for providing an indication of the prevailing fluid-level in said container substantially independently of the prevailing value of fluid electrical conductivity.

7. An electrical fluid level gauge for conductive fluids comprising means providing two alternating voltages having opposed phases with respect a common grounded terminal and control means for controlling the amplitude of one thereof, a fluid metallic container electrically connected to said grounded terminal, an elongated sheath structure of insulating material supported within said container and having fluid-impervious side wall portions with a fluid-pervious bottom end portion, a measuring unit included with one of said voltages in an arm of an alternating current bridge and having spaced elongated electrically conductive electrodes adapted to be supported within said sheath structure to provide a value of interelectrode electrical conductance varying both with the level of fluid in said container and the value of conductivity of said fluid, a reference-compensating unit included with the other of said voltages in a second arm of said bridge and having at least one electrically conductive electrode spaced from said measuring unit electrodes and adapted to be supported within said sheath structure to be continuously fully immersed in said fluid and provide a value of electrode electrical conductance varying with the conductivity of said fluid and independent of the level thereof, a source of adjustable-amplitude alternating voltage of selectable phase and an electrically resistive unit included in a third arm of said bridge to effect balance thereof at a preselected level of fluid in said container corresponding to the empty level thereof, means responsive to unbalance of said bridge with change of the fluid-level in said container for controlling said control means to maintain a substantially balanced state of said bridge, and means controlled by said last-named means for providing an indication of the prevailing fluid-level in said container substantially independently of the prevailing value of fluid electrical conductivity.

8. An electrical fluid level gauge for conductive fluids comprising means providing two alternating voltages having opposed phases with respect a common grounded terminal and control means for controlling the amplitude of one thereof, a fluid metallic container electrically connected to said grounded terminal, an elongated sheath member of insulating material supported within said container and having fluid-impervious side wall portions and a fluid-pervious apertured bottom wall portion, a measuring unit included with one of said voltages in an arm of an alternating current bridge and having spaced elongated electrically conductive electrodes adapted to be supported within said sheath member to provide a value of interelectrode electrical conductance varying both with the level of fluid in said container and the value of conductivity of said fluid, a reference-compensating unit included with the other of said voltages in a second arm of said bridge and having at least one electrically conductive electrode spaced from said measuring unit electrodes and adapted to be supported within said sheath structure to be continuously fully immersed in said fluid and provide a value of electrode electrical conductance varying with the conductivity of said fluid and independent of the level thereof, a source of adjustable-amplitude alternating voltage of selectable phase and an electrically resistive unit included in a third arm of said bridge to effect balance thereof at a preselected level of fluid in said container corresponding to the empty level thereof, means responsive to unbalance of said bridge with change of the fluid-level in said container for controlling said control means to maintain a substantially balanced state of said bridge, and means controlled by said last-named means for providing an indication of the prevailing fluid-level in said container substantially independently of the prevailing value of fluid electrical conductivity.

9. An electrical fluid level gauge for conductive fluids comprising means providing two alternating voltages having opposed phases with respect a common grounded terminal and control means for controlling the amplitude of one thereof, a fluid metallic container electrically connected to said grounded terminal, a measuring unit included with one of said voltages in an arm of an alternating current bridge and having spaced electrically conductive electrodes adapted to be supported in said fluid container to provide a value of interelectrode electrical conductance varying both with the level of fluid in said container and the value of conductivity of said fluid, a reference-compensating unit included with the other of said voltages in a second arm of said bridge and having at least one electrically conductive electrode spaced from said measuring unit electrodes and adapted to be supported in said container to be continuously fully immersed in said fluid and provide a value of electrode electrical conductance varying with the conductivity of said fluid and independent of the level thereof, a source of adjustable-amplitude alternating voltage of selectable phase and an electrically resistive unit included in a third arm of said bridge to effect balance thereof at a preselected level of fluid in said container corresponding to the empty level thereof, a sheath structure of insulating material supported within said container to enclose the electrodes of said units by fluid-impervious vertical walls and a fluid-pervious ported floor having conductance restrictive port cross-sectional dimensions effective to reduce the value of electrical conductance between each of said electrodes and said container, means responsive to unbalance of said bridge with change of the fluid-level in said container for controlling said control means to maintain a substantially balanced state of said bridge, and means controlled by said last-named means for providing an indication of the prevailing fluid-level in said container substantially independently of the prevailing value of fluid electrical conductivity.

References Cited by the Examiner
UNITED STATES PATENTS

| | | | |
|---|---|---|---|
| 2,942,467 | 6/1960 | Campani | 73—304 |
| 3,079,797 | 3/1963 | Hermanson | 73—304 |
| 3,114,262 | 12/1963 | Atun | 73—304 |
| 3,224,275 | 12/1965 | Fahley | 73—304 |

LOUIS R. PRINCE, *Primary Examiner.*

S. C. SWISHER, *Assistant Examiner.*